US009600585B2

(12) United States Patent
de la Chica et al.

(10) Patent No.: US 9,600,585 B2
(45) Date of Patent: *Mar. 21, 2017

(54) USING READING LEVELS IN RESPONDING TO REQUESTS

(71) Applicant: Microsoft Technology Licensing, LLC, Redmond, WA (US)

(72) Inventors: Sebastian de la Chica, Woodinville, WA (US); Kevyn B. Collins-Thompson, Seattle, WA (US); Paul N. Bennett, Kirkland, WA (US); David Alexander Sontag, New York City, NY (US); Ryen W. White, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/616,399

(22) Filed: Feb. 6, 2015

(65) Prior Publication Data

US 2015/0154307 A1    Jun. 4, 2015

Related U.S. Application Data

(63) Continuation of application No. 13/225,583, filed on Sep. 6, 2011, now Pat. No. 8,954,423.

(51) Int. Cl.
    *G06F 17/30*    (2006.01)
    *G06F 17/27*    (2006.01)

(52) U.S. Cl.
    CPC ........ *G06F 17/30867* (2013.01); *G06F 17/27* (2013.01); *G06F 17/3053* (2013.01); *G06F 17/30699* (2013.01)

(58) Field of Classification Search
    CPC ................................................. G06F 17/30867
    (Continued)

(56) References Cited

U.S. PATENT DOCUMENTS 7,827,170 B1    11/2010  Horling et al.
2007/0067294 A1*  3/2007  Ward ................ G06F 17/30867
(Continued)

OTHER PUBLICATIONS

Liu, et al., "Personalized Web search for improving retrieval effectiveness", Retrieved at <<http://ieeexplore.ieee.org/stamp/stamp.jsp?tp=&arnumber=1264820>>, IEEE Transactions on Knowledge and Data Engineering, vol. 16, No. 1, Jan. 2004, pp. 28-40.

(Continued)

*Primary Examiner* — Hosain Alam
*Assistant Examiner* — Tuan-Khanh Phan
(74) *Attorney, Agent, or Firm* — Jared S. Goff; Goff Patent Law PLLC (57) ABSTRACT

A request can be received and a request reading level representation for the request can be inferred. In response to the request, the request reading level representation can be compared with one or more reading difficulty level representations for one or more response items. Also in response to the request, one or more indications of results of comparing the request reading level representation with one or more reading difficulty level representations for the one or more response items can be returned. The indication(s) may include a ranking of the response items. The ranking can be based at least in part on a request reading level representation for the query and reading difficulty level representations for the response items. The response item(s) may also be returned.

20 Claims, 5 Drawing Sheets

(58) Field of Classification Search
USPC .................................................. 707/705–788
See application file for complete search history.

(56) References Cited

U.S. PATENT DOCUMENTS

| | | | |
|---|---|---|---|
| 2007/0233671 | A1* | 10/2007 | Oztekin ............ G06F 17/30867 |
| 2007/0239688 | A1 | 10/2007 | Clark et al. |
| 2008/0319976 | A1 | 12/2008 | Morris et al. |
| 2010/0088331 | A1 | 4/2010 | White et al. |
| 2010/0138413 | A1 | 6/2010 | Wu et al. |
| 2010/0228715 | A1 | 9/2010 | Lawrence |
| 2011/0040753 | A1 | 2/2011 | Knight |

OTHER PUBLICATIONS

Noll, et al., "Web search personalization via social bookmarking and tagging", Retrieved at <<http://citeseerx.ist.psu.edu/viewdoc/download?doi=10.1.1.97.8894&rep=rep1&type=pdf>>, Proceedings of the 6th international The semantic web and 2nd Asian conference on Asian semantic web conference, 2007, pp. 367-380.

Kumar et al., "Personalized Profile Based Search Interface with Ranked and Clustered Display", Retrieved at <<http://citeseerx.ist.psu.edu/viewdoc/download;jsessionid=2D23CAE104DA7DA09325F4DB8A0A7509?doi=10.1.1.125.7772&rep=rep1&type=pdf>>, Conference on Intelligent Agents Web Technologies and Internet Commerce, Jun. 1, 2001, pp. 20.

Bilal, Dania, "Children's Use of the Yahooligans! Web Search Engine: Cognitive, Physical, and Affective Behaviors on Fact-based Search Tasks", Retrieved at <<http://ithreads.pbworks.com/f/yhoo1.pdf>>, Journal of the American Society for Information Science, May 2000, pp. 646-665.

Clarke, et al., "The Influence of Caption Features on Clickthrough Patterns in Web Search", Retrieved at <<http://research.microsoft.com/en-us/um/people/sdumais/sigir2007-fp230-clarkeetal.pdf>>, Proceedings of the 30th annual international ACM SIGIR conference on Research and development in information retrieval, Jul. 23-27, 2007, pp. 8.

Thompson, et al., "A Language Modeling Approach to Predicting Reading Difficulty", Retrieved at <<http://acl.ldc.upenn.edu/N/N04/N04-1025.pdf>>, Proceedings of the HLTNAACL 2004 Conference, pp. 8.

Druin, et al., "Children's Roles using Keyword Search Interfaces at Home", Retrieved at <<http://dmrussell.net/CHI2010/docs/p413.pdf>>, Proceedings of the 28th international conference on Human factors in computing systems, Apr. 10-15, 2010, pp. 413-422.

Gao, et al., "Smoothing Clickthrough Data for Web Search Ranking", Retrieved at <<http://research.microsoft.com/pubs/80246/click.gao-et-al.camera.v2.pdf>>, Proceedings of the 32nd international ACM SIGIR conference on Research and development in information retrieval, Jul. 19-23, 2009, pp. 9.

Gyllstrom, et al., "Wisdom of the Ages: Toward Delivering the Children's Web with the Link-based AgeRank Algorithm", Retrieved at <<https://lirias.kuleuven.be/bitstream/123456789/276006/1/GyllstromCIKM.pdf>>, Proceedings of the 19th ACM international conference on Information and knowledge management, Oct. 26-30, 2010, pp. 10.

Kidwell, et al., "Statistical Estimation of Word Acquisition with Application to Readability Prediction", Retrieved at <<http://research.microsoft.com/en-us/um/people/kevynct/pubs/emnlp2009-wordacq.pdf>>, Proceedings of the 2009 Conference on Empirical Methods in Natural Language Processing, vol. 2, pp. 10.

Kumaran, et al., "Biasing Web Search Results for Topic Familiarity", Retrieved at <<http://citeseerx.ist.psu.edu/viewdoc/download-?doi=10.1.1.88.8684&rep=rep1&type=pdf>>, Proceedings of the 14th ACM international conference on Information and knowledge management, Oct. 31-Nov. 5, 2005, pp. 2.

Liu, et al., "Automatic Recognition of Reading Levels from User Queries", Retrieved at <<http://ciir.cs.umass.edu/pubfiles/ir-351.pdf>>, Proceedings of the 27th annual international ACM SIGIR conference on Research and development in information retrieval, Jul. 25-29, 2004, pp. 2.

"PuppyIR: An Open Source Environment to Construct Information Services for Children", Retrieved at <<http://www.puppyir.eu/>>, May 6, 2011, pp. 2.

Teevan, et al., "Personalizing Search via Automated Analysis of Interests and Activities", Retrieved at <<http://research.microsoft.com/en-us/um/people/sdumais/sigir2005-personalizedsearch.pdf>>, Proceedings of the 28th annual international ACM SIGIR conference on Research and development in information retrieval, Aug. 15-19, 2005, pp. 8.

Torres, et al., "An Analysis of Queries Intended to Search Information for Children", Retrieved at <<http://doc.utwente.nl/75360/1/iiix10.pdf>>, Proceeding of the third symposium on Information interaction in context, Aug. 18-21, 2010, pp. 10.

Kalsbeek, et al., "Automatic Reformulation of Children's Search Queries", Retrieved at <<http://citeseerx.ist.psu.edu/viewdoc/download?doi=10.1.1.168.881&rep=rep1&type=pdf>>, CTIT Technical Report 10-X, 2010, pp. 13.

White, et al., "Predicting Short-term Interests using Activity-based Search Context", Retrieved at <<http://research.microsoft.com/en-us/um/people/ryenw/papers/whitecikm2010.pdf>>, Proceedings of the 19th ACM international conference on Information and knowledge management, Oct. 26-30, 2010, pp. 1009-1018.

White et al., "Characterizing and Predicting Search Engine Switching Behavior", Retrieved at <<http://citeseerx.ist.psu.edu/viewdoc/download?doi=10.1.1.147.5401&rep=rep1&type=pdf>>, Proceeding of the 18th ACM conference on Information and knowledge management, Nov. 2-6, 2009, pp. 10.

White, et al., "Characterizing the Influence of Domain Expertise on Web Search Behavior", Retrieved at <<http://research.microsoft.com/pubs/79630/wsdm09-expertise.pdf>>, Proceedings of the Second ACM International Conference on Web Search and Data Mining, Feb. 9-11, 2009, pp. 10.

Wu, et al., "Adapting Boosting for Information Retrieval Measures", Retrieved at <<http://citeseerx.ist.psu.edu/viewdoc/download?doi=10.1.1.157.5117&rep=rep1&type=pdf>>, Information Retrieval, vol. 13, Issue 3, Jun. 2010, pp. 17.

Zhai, et al., "Beyond Independent Relevance: Methods and Evaluation Metrics for Subtopic Retrieval", Retrieved at <<http://citeseerx.ist.psu.edu/viewdoc/download?doi=10.1.1.14.6643&rep=rep1&type=pdf>>, Proceedings of the 26th annual international ACM SIGIR conference on Research and development in informaion retrieval, Jul. 28-Aug. 1, 2003, pp. 8.

"Modeling Intent and Ranking Search Results Using Activity-based Context", filed Dec. 16, 2010, U.S. Appl. No. 12/970,875, pp. 50.

"Ranking Contextual Signals for Search Personalization", filed Mar. 14, 2011, U.S. Appl. No. 13/047,466, pp. 35.

"Functionality for Personalizing Results", filed Jun. 17, 2011, U.S. Appl. No. 13/162,906, pp. 58.

Bennett, et al., "Classification-Enhanced Ranking", WWW2010, Apr. 26-30, 2010, pp. 10.

Hirsh, S. G., Abstract of "Children's Relevance Criteria and Information Seeking on Electronic Resources", Retrieved at <<http://cat.inist.fr/?aModele=afficheN&cpsidt=1203806>>, 1999, pp. 1.

Wang, et al., "PSkip: Estimating Relevance Ranking Quality from Web Search Clickthrough Data", KDD '09, Jun. 28-Jul. 1, 2009, pp. 1355-1363.

Chall, et al., Readability Revisited: The New Dale-Chall Readability Formula, 1995, 161 Pages, Brookline Books.

"Search Google by Reading Level", Posted Feb. 1, 2011, 5 Pages.

"View Google Search Results by Reading Level", Posted Jan. 29, 2011, 3 Pages.

\* cited by examiner

USING READING LEVELS IN RESPONDING TO REQUESTS

RELATED APPLICATIONS

The present application is a continuation of U.S. application Ser. No. 13/225,583, filed Sep. 6, 2011, which is incorporated herein by reference. If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

BACKGROUND

Computerized search engines are able to search for and return documents in response to receiving queries. The returned documents may come in any of a variety of forms, such as textual pages posted online (e.g., HTML pages, PDF pages, word processing documents, etc.), snippets of textual pages that are displayed as search results, search suggestions generated for an entered search request, and advertisements that may be displayed on a search results page. Search engines currently match and rank documents in search results based on a number of factors, such as popularity of the documents and how well the terms of documents match the query. There may be multiple rankings of response documents in response to a single query. For example, a search engine may rank the search result documents themselves, and the search engine may also rank advertisements to be displayed on a page of search results.

SUMMARY

Documents that are available for computerized searching may be written at a wide range of different reading difficulty levels: from easy introductory texts and material written specifically for children, to difficult, highly-technical material for experts that requires advanced vocabulary knowledge to understand. Similarly, different users who request searches of documents can each be seeking documents with different reading levels. Additionally, users may seek documents with different reading levels in different queries or for different scenarios (e.g., a parent searching for technical material for themselves, but less technical material on the same topic for their children). Described tools and techniques can include using reading levels in responding to queries and other requests. As used herein, reading levels or reading difficulty levels refer to representations or models of reading difficulty, such as for a document, response item, user profile, query, request, etc. Such models or representations can reflect one or more aspects that could make reading more or less difficult. For example, these aspect(s) may include but are not limited to one or more of the following: semantics (e.g., vocabulary); syntax (e.g., sentence structure, complexity of syntax), discourse-level structure (e.g., whether the text includes coherent arguments, whether the text includes higher-level discussion structure); reader background, familiarity and interest in relevant topic(s) (for example, it can be easier to read something if the reader is interested in learning about the topic); text legibility (e.g., font size, resolution); and existence of supporting illustrations and layout that may make reading easier.

In one embodiment, the tools and techniques can include receiving a request and inferring a request reading level representation for the request. As used herein, inferring a request (e.g., query) reading level representation includes determining one or more reading levels (e.g., a single level and/or a distribution over levels) for the request and generating a representation of the determined level(s). The determination of level(s) is based at least in part on information other than an express reading level indication (e.g., such an indication from user input), although such an indication may be used as part of the basis for the determination. As used herein, determined reading levels and/or reading proficiencies are predicted reading levels and/or proficiencies, which may or may not represent actual reading levels/proficiencies of documents, user profiles, queries, etc. In response to the request, the request reading level representation can be compared with one or more reading difficulty level representations for one or more response items (e.g., search results, advertisements to be displayed, suggestions, etc.). Also in response to the request, one or more indications of results of comparing the request reading level representation with one or more reading difficulty level representations for the one or more response items can be returned. The response item(s) may also be returned in response to the request. Comparing the request reading level representation with the reading difficulty level representation(s) for response item(s) can include using the request reading level representation and the reading difficulty level representation(s) for search result item(s) in an analysis that yields the indication(s) of results of the comparison. For example, the request reading level representation and the reading difficulty level representation(s) for response item(s) may be used as features in a ranking technique, such as an initial ranking technique and/or a re-ranking technique.

In another embodiment of the tools and techniques, a query can be received. In response to the query, search result items can be ranked. The ranking can be based at least in part on a query reading level representation for the query and reading difficulty level representations for the search result items. Additionally, in response to the query, the search result items and one or more indications of the ranking can be returned.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Embodiments described herein are directed to techniques and tools for using reading difficulty levels in responding to requests. Embodiments may use various techniques and tools separately or in combination.

Such techniques and tools may include inferring a reading level representation for a request such as a query. This detailed description will discuss a query as an example of a request that can be responded to using reading difficulty levels, such as by ranking results in response to the query. However, the same techniques may apply in responding to requests other than queries, such as where a user makes a request (e.g., by requesting a specific Web page) and a set of appropriate recommendations are provided on the Web page using reading difficulty levels. For example, the reading difficulty levels could be used to match the recommendations to the reading difficulty level of the request and/or the Web page that is provided in the response. Inferring a reading level representation can include analyzing the impact of various types of information on reading level for a given request. The reading level representation for a request may be a reading level representation that is associated with the request in one or more of various ways. For example, the reading level representation for a query may be based at least in part on a reading level for a profile that is associated with the query, a reading level for the query itself, a reading level for a session that includes the query, a reading level for a long-term search and browsing history, and/or other information that may indicate a reading level for the query. A session may be defined in various different ways, but in one implementation a session may begin with a query, occur within the same Web browser and Web browser tab instance, and terminate following thirty minutes of inactivity on a Web page. In some embodiments, the inference of the query reading level may be based in part on an express user indication of reading level, in additional to other information. In yet other embodiments, a reading level representation for a query may be based solely on an express user indication of reading level instead of inferring the reading level representation.

The information used to infer a reading level representation for a request may include information such as information from user queries, sessions, long-term history, and search and browsing behavior. For example, inferring the reading level representation for a current query may include analyzing the reading level of the current query, analyzing the reading level of prior queries, analyzing the reading level of documents that have previously been selected in search results, etc. Other information may also be considered, such as preferences or other information related to a profile associated with the query.

Using the reading level representation for the current query, search results can be provided in response to a request. For example, one or more reading level features may be used to personalize search results. Search results may be personalized to one or more user profiles, to a particular query or set of queries, to a particular Web site such as a portal site from which a request was entered, etc. The reading level features and possibly other features may be input to machine learning techniques to provide personalized indications, which may be used to perform personalization tasks such as adaptive ranking of search results (e.g., Web pages), level-appropriate presentation of search results (e.g., filtering search results to only display those appropriate for the estimated reading level for the current query), level-appropriate filtering of media types (images, videos, graphs), or adaptive search engine result page composition (modifying layout, colors, fonts, etc. to suit a query's reading level(s)). Personalizing the search results may be done to match the search results to an estimated current query reading level. Alternatively, search results may be personalized in some other way. For example, search results may be slightly above the reading level of the current query. This may allow a user to extend the user's vocabulary. The personalized search results may be used in various ways. For example, reading level estimates for one document could be used to find other documents of a similar estimated reading level. In one example, user input could request more documents like a currently-displayed document.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, dedicated hardware implementations, such as application specific integrated circuits, programmable logic arrays and other hardware devices, can be constructed to implement at least a portion of one or more of the techniques described herein. Applications that may include the apparatus and systems of various embodiments can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

I. Exemplary Computing Environment

Figure 1:
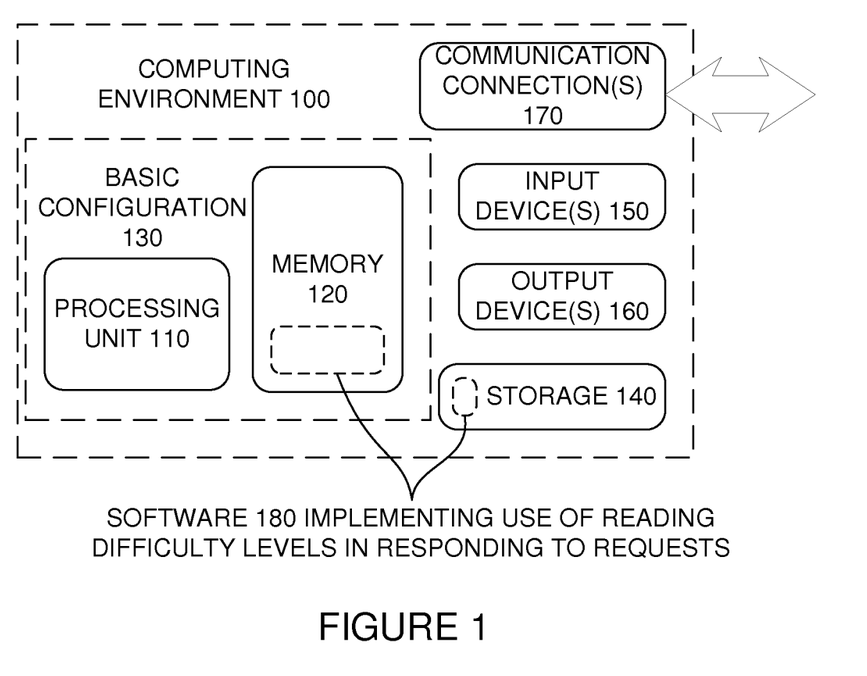
FIG. 1 is a block diagram of a suitable computing environment in which one or more of the described embodiments may be implemented.

FIG. 1 illustrates a generalized example of a suitable computing environment (100) in which one or more of the described embodiments may be implemented. For example, one or more such computing environments can be used as an environment for providing and/or receiving search results that are personalized by reading difficulty level. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessorbased systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing the use of reading difficulty levels in responding to requests.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

Figure 2:
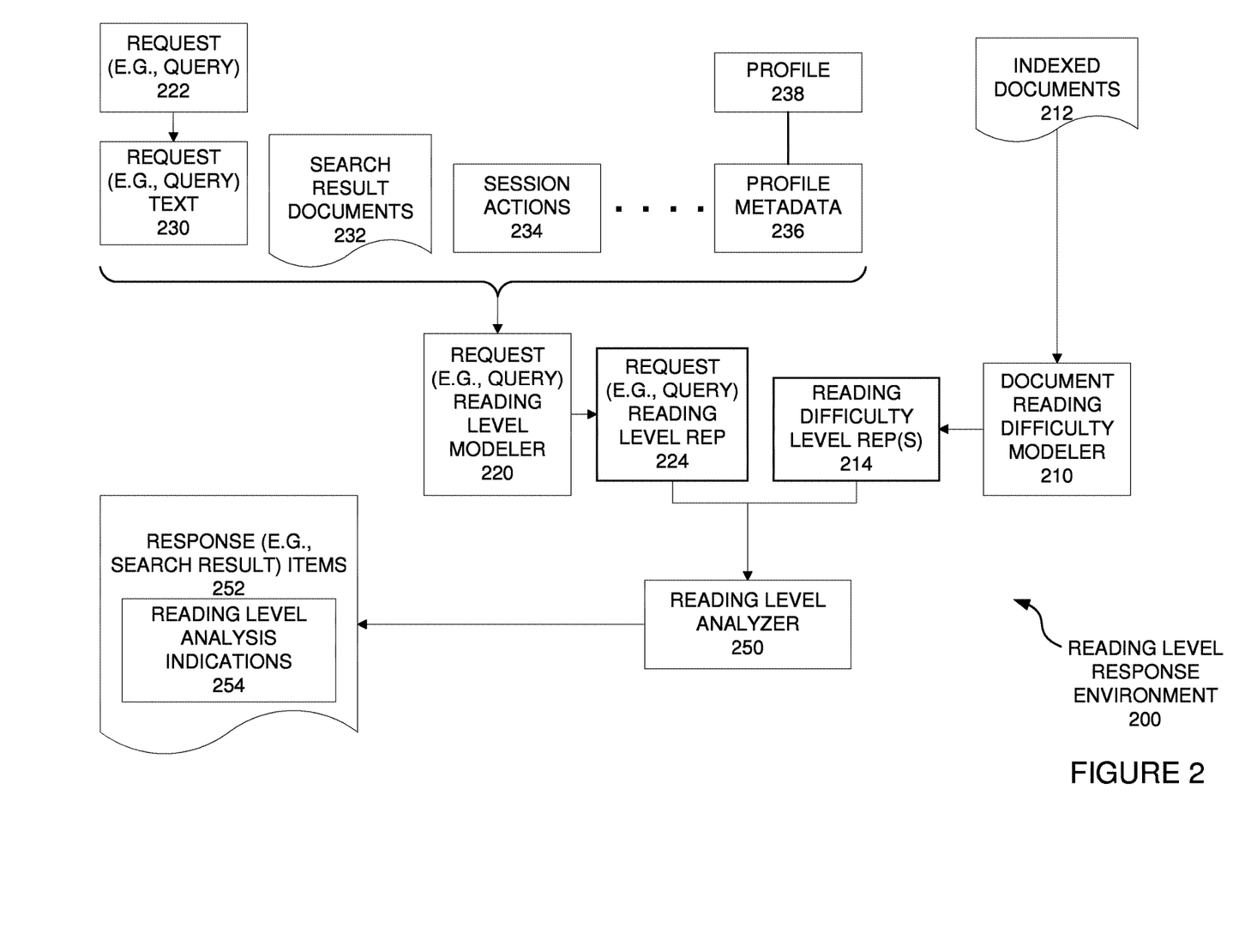
FIG. 2 is a schematic diagram of a reading level response environment.

II. System and Environment for Search Result Personalization by Reading Difficulty Level FIG. 2 is a block diagram of a reading level response environment (200) in conjunction with which one or more of the described embodiments may be implemented.

A. Document Reading Difficulty Modeler

The reading level response environment (200) can include a document reading difficulty modeler (210). The document reading difficulty modeler (210) can analyze indexed documents (212) (which are to be searched) to determine a reading difficulty level representation (214) for each of the indexed documents (212). Alternatively, a reading difficulty modeler could analyze other documents or items that are to be returned in response to a request. For example, a reading difficulty modeler could analyze reading levels for advertisements that are to be displayed on a search page. As another example, a reading difficulty modeler could analyze reading levels for items that are to be suggested by a recommender system that makes recommendations in response to a request (e.g., in response to entering information on a Web page that includes the recommendations). In the example of search documents, the document reading difficulty modeler (210) may perform this modeling and store the reading difficulty level representation (214) for each indexed document (212) along with other metadata regarding the indexed document (212). The document reading difficulty modeler (210) can define a statistical model that characterizes the reading difficulty of a text as a reading difficulty level representation (214) that represents a distribution over levels of reading difficulty. In one example, the difficulty levels may correspond to school grade levels. However, difficulty levels could be characterized in different ways. For example, the reading levels could be customized for different populations, topical categories, etc.

In one implementation, the document reading difficulty modeler (210) may combine a smoothed unigram count model with a model based on estimated age of word acquisition. This approach can allow the document reading difficulty modeler (210) to model the reading difficulty of a Web document based on its full contents and/or on representative snippets of the documents, such as search result captions.

A specific implementation of the modeling by the document reading difficulty modeler (210) will now be described. The reading difficulty of a document or text can be represented as a random variable $R_d$ taking values in the range from one to twelve. In this implementation, these values can correspond to school grade levels first through twelfth of the United States education system (e.g., a value of five would indicate an estimated fifth grade reading level). However, the values could be modified to reflect finer or coarser distinctions in level, or for different tasks or populations. Reading level predictions can be generated for two different representations of a page: the combined title and summary text, which can be referred to as a "snippet," that can appear for that page in a search engine results page; and the full body text extracted from the code for the underlying page. The snippet and full body text may both provide useful information when generating reading level predictions. While the snippet provides a relatively short sample of content for the underlying page, it can be query-specific, and is often what users see in choosing whether or not the corresponding document may be relevant and thus whether to click the result item. The snippet itself can be considered a document, as used herein. The full-page text is independent of a particular query, and is what users see after clicking on a result item on a search result page.

The document reading difficulty modeler (210) can use a technique that can predict and model difficulty for both short, noisy texts, and full-page texts such as Web pages. The technique may be a technique based on statistical language modeling. The technique can provide extra information about reading difficulty score reliability by computing a distribution over multiple levels. That distribution can be used to compute confidence estimates. Moreover, a language modeling technique can be vocabulary-centric and may capture fine-grained patterns in individual word behavior across reading levels. Thus, such a technique may provide useful reading level predictions for noisy, short, fragmented text that that can occur, such as in queries, titles, search result snippets, image or table captions, etc. Because of this short, noisy nature of many search-related texts, such as search result snippets, the technique can apply a vocabulary-oriented reading difficulty prediction technique that can combine a smoothed unigram approach and a model based on estimated age of word acquisition.

In the technique, a document D has a predicted (r; s)-reading level t if at least s percent of the words in D are familiar to at least r percent of the general population. A word can be considered to have r-acquisition level $\mu_w(r)$ if r percent of the population has acquired the word by grade $\mu_w$. For a fixed (but large in some implementations) vocabulary V of distinct words, an approximate age-of-acquisition can be defined for all words w in the set of words V using a truncated normal distribution with parameters ($\mu_w$; $\sigma_w$), where $\sigma_w$ represents a strength of the indication $\mu_w$ for the grade level. An estimate of ($\mu_w$; $\sigma_w$) can be generated from a corpus of labeled Web content. The Web content can include pages that are each given a reading difficulty level. For example, the pages may each be given a reading difficulty level by user input. Counts can be made of how often each vocabulary word appears in documents in each of the reading levels. Accordingly, these counts can provide, for each vocabulary word, a distribution of counts for reading levels. A smoothing technique can be applied to these counts. Using the smoothed distribution, a value for a strength of the reading level indication for that word can be obtained. For example, some words can have a strong tendency to appear in documents at a particular grade level (i.e., they have high counts in a particular grade level or small range of grade levels, compared to counts in other grade levels), while others may appear at about the same rate across all grade levels.

Using the resulting word parameters, ($\mu_w$; $\sigma_w$), the above definition of (r; s)-reading difficulty level can be applied. To compute the readability distribution of a text passage, individual word predictions can be accumulated into a stepwise cumulative density function (CDF). Each word can contribute in proportion to its frequency in the passage. The reading level of the text can then be the grade level corresponding to the s-th percentile of the text's word acquisition CDF. In one implementation, r may be set to a value of 0.80 and s may be set to a value of 0.65.

One or more other measures of reading difficulty level may be used in addition to or instead of the technique described above. For example, vocabulary-based difficulty may be predicted by computing the fraction of unknown words in a query or snippet relative to a list of known words. For example, the fraction (which may be called a "Dale readability measure" in one implementation) may be relative to the Dale 3000 word list, which is the semantic component of the Dale-Chall reading difficulty measure.

B. Request Reading Level Modeler

Referring still to FIG. 2, a request reading level modeler (220) can analyze a current request (e.g., a query) (222) and/or other information to infer a request (e.g., query) reading level representation (224). The information analyzed by the request reading level modeler (220) may be any of a variety of different types of information that may assist in predicting a desired reading level for the current request (222). Such a predicted reading level may or may not reflect an actual reading proficiency level of a user who submitted the current request (222). For example, a single user may desire different reading levels at different times or for different categories of information. Consider a user who is an expert in microbiology but is a novice woodworking hobbyist. As another example, an expert ornithologist may sometimes submit queries to retrieve in-depth high reading difficulty level ornithology documents. However, that same expert may submit a particular query to look for introductory material for a presentation on birds to be given to a school class of ten and eleven year old children.

In one example, the request reading level modeler (220) may analyze the request (e.g., query) text (230) of the current request (222). As a few other examples, the analyzed information may include the search result documents (232) for the current request (222), session actions (234) from a current session, profile metadata (236) for a profile (238) associated with the current request (222), etc.

As an example, one implementation of a technique for a request reading level modeler (220) will now be described. To match the difficulty representation of a document, a proficiency profile for user profile u can be defined to be a distribution $p(R_u)$ over reading levels, representing a prediction of the probability that a document will be understood. As with the document, $R_u$ can take values in the range of reading levels. Consider the following distribution for readability:

$$p(u \text{ understands } d | R_u = k; R_d = l) = \exp(\min(0; k-l)),$$

where u is a user, d is a document, $R_u$ is a reading level of the user, and $R_d$ is the reading difficulty level of the document. According to the above distribution, a user profile that is predicted to have a reading level at level k is considered to be able to understand documents whose reading difficulty is at most level k, and the probability that documents whose reading difficulty is larger than k will be understood is considered to decrease exponentially with the distance between the reading difficulty level of the document and the predicted reading proficiency level of the user profile.

One approach to modeling a user's reading level $R_u$ is to have users self-identify their level of reading proficiency. This technique can be simple and transparent, and it may provide some useful information. However, using this technique alone can be limiting. For example, it may be difficult for users to properly calibrate their own reading level. Also, reading proficiency may change over time, it may be dependent on the actual query issued, and the reading proficiency of the user may be different from a desired reading level for the request (e.g., an expert searching for material to present to a fifth grade school class).

Accordingly, other information may be used to infer reading level. This inference may or may not utilize information about a user's self-identification of reading level. This inference may be based on one or more types of information that can be used to predict a reading level representation for a request such as a query. This information may include the previous queries and click-throughs in the session, and/or in the user's long-term history. Here, a generative model can be used to estimate $p(R_u)$ from a user's search behavior. Although the prior distribution $p(R_u)$ may be assumed to be the same for all of a user's search sessions, the probability distribution $p(R_u|\text{query})$ of the current query can depend on the current query itself, and may differ between sessions and between queries within a session queries. Q can denote the set of queries that the user has issued in this session, and $D_q$ can denote the documents that the user clicks on in response to the query. A session may be generated as follows:

1. $r_d \sim p(R_d)$
2. $r_u \sim p(R_u)$ (to estimate)
3. For all q in Q:
   a. $q \sim p(\text{query}|r_u)$
   b. For all d in $D_q$:
      SAT-click=1~$p(u \text{ understands } d|r_u; r_d)$ where $p(R_d)$ is the reading difficulty level representation for a document d in $D_q$, which can be calculated as the document reading difficulty level representations discussed above, and SAT-click is a satisfied click, discussed more below.

The distribution $p(\text{query}|R_u)$ can be a language model that is directly estimated using search engine logs that record queries and post-query behaviors, such as search result clicks and post-query browsing. An alternative is to use the language model developed for document classification and apply the model to query text. However, query readability may be different from document readability. For example, the words a user recognizes may be different from the words that a user chooses to use in queries. Another approach is to model the length of the query, ignoring the actual words. These techniques and/or others can be used to compute a session-based query difficulty measure. For example, an average reading level of documents reached with satisfied clicks that a user enacts in previous queries within the session may be used. Satisfied clicks can be defined in one of various ways, such as clicks where there is a post-click dwell time of at least 30 seconds, or the click is the last click on a search result item in the session. Alternatively, other techniques for estimating understanding and/or satisfaction with search results may be used.

Additionally, other information can be used to infer the reading level for the query. For example, frequently visited websites could be indicative of reading level for an associated user profile. Other examples of information that could be used in this inference include implicit information about the user task based on contextual signals (e.g., an executive writing a word processor document in the office vs. a student writing an essay inside the school's learning management system), and metadata about the user profile obtained from external systems (e.g., age or grade level from a social network profile). The query words themselves may be analyzed in isolation (e.g., using the reading level difficulty classification technique discussed above for documents) or they may be analyzed by more sophisticated models that use additional context information, such as the top N results returned by a search engine in response to those query words.

In obtaining and using such information for inferring reading level for a query, privacy of users can be respected using techniques such as allowing users to opt in and/or opt out, not storing unnecessary personal identifying information, protecting the information from outside disclosure, etc.

C. Reading Level Analyzer

A reading level analyzer (250) can receive and compare the request reading level representation (224) and the reading difficulty level representation(s) (214), and can produce response (e.g., search result) items (252), which may themselves be documents (e.g., snippets, suggestions, etc., as discussed above). The response items (252) can include one or more reading level analysis indications (254) of results of the reading level analyzer (250) comparing the request reading level representation (224) and the reading difficulty level representation(s) (214).

The reading level analyzer (250) may use one or more of the reading difficulty and proficiency level models discussed above to provide a personalized search experience by combining features estimated from the models. Such models may include, for example: (1) the current and previous queries, including reading difficulty estimates; (2) reading difficulty estimates of documents and document snippets returned by the search engine in response to those queries; (3) static and dynamic ranking information computed by the search engine; (4) query or document metadata, such as pre-computed category predictions relative to topics in a topic hierarchy such as the Open Directory Project; and (5) differences between the user profile's estimated reading proficiency model and the estimated reading difficulty of a particular document. For example, the reading level response environment (200) can use machine learning to learn the optimal ranking of search engine results such that those with reading difficulty closest to the current value of the estimated reading proficiency level for the current query would be presented towards the top page. In another example, more efficient search could be achieved by adaptively retrieving material at the right reading level from the index. Similarly, other aspects of the search experience may be personalized using reading level. Such aspects can include the set of results retrieved from the index, search result page composition, ratio of text to images and videos in the search results, etc.

The reading level response environment (200) can analyze user actions, such as document clicks or time spent on a document, and the reading level response environment (200) can dynamically and automatically adapt to user behavior. For instance, the system can evolve its request reading level representations (224) as a user's information needs drift from seeking low reading level materials for a user's school-age children to seeking advanced reading level research materials on cutting edge technologies within the same search engine session or across different search engine sessions. As another example, the request reading level representations (224) could evolve as actions associated with a user profile indicate a predicted reading level of the user profile has increased with respect to one or more topics.

In one implementation, the reading level analyzer (250) may perform an initial ranking of documents, or the reading level analyzer (250) may re-rank the search result documents (232) that have been returned by a search engine. For training the re-ranking technique, a training technique can be used on search engine log data. For example, a technique that produces a tree-based model, such as the LambdaMART algorithm, which is based on boosted regression trees, can be used for machine learning of re-ranking feature models. The learning using the LambdaMART algorithm can include selecting features and/or ranking the features by their importance so that different weights can be applied to different features. In one example of an implementation, the features described below may be applied along with learned weights to re-rank initial search results. Fewer than all of these features may be used. Also, other features may be used and/or instead of these features. For example, other features could include user profile features, such as an average predicted reading level of documents that have been read under a user profile associated with the current query.

Query Features. These features rely on the query string for the current query and include query length in characters and query length in space-delimited words.

Query/Session Features. If previous queries were present in a session, a dynamic reading level for a user profile can be estimated by taking the average reading level of the clicked snippets from previous queries in the same user search session. Because of the sparse nature of clicks, a confidence value for this query level can be computed. The confidence level can increase with the sample size of clicked snippets. These features can also include a measure of the length of a session, in terms of the number of previous queries.

Snippet Features. The reading difficulty of a snippet for a search result document being analyzed that is estimated using the reading difficulty prediction technique described above, as well as the Dale-Chall semantic variable that is also described above, may be used as features. Another feature can be the relative difficulty of the snippet for the search result document being analyzed, as compared to the levels of the other top-ranked result snippets. The snippets can be sorted by descending reading difficulty level, and then the reciprocal rank of the snippet for the search result document being analyzed can be computed with respect to that ranking.

Page Features. Using the same reading level prediction technique used for snippets, reading difficulty can be computed for the body text of the document (e.g., a Web page) corresponding to a snippet.

The following table summarizes these features used in an implementation of a re-ranker for search results in response to a query, as discussed above. As noted above, these features can be weighted and applied to re-rank search results. As has also been discussed above, different features than these may be used.

| Source | Description |
| --- | --- |
| Query | Current query length (in characters) |
|  | Current query length (in words) |
| Query (Session-potentially makes use of previous queries in a session) | Session-based user profile reading level estimate |
|  | Number of previous queries in current search session |
|  | Confidence estimate for user profile reading level estimate |
| Snippet | Reading level of snippet for document being analyzed |
|  | Relative snippet for document being analyzed difficulty in top ten results |
|  | Dale difficulty level of snippet for document being analyzed |
| Page | Reading level of page body text for document being analyzed |
|  | Confidence level for page body text reading level for document being analyzed |
| Snippet-Page | Difference between predicted levels of snippet and full page for document being analyzed |
| Query-Page | Normalized ranker score for document being analyzed, from initial search ranking |
|  | Reciprocal rank of page, from initial search ranking |
| Query-Snippet | Signed difference in reading level between current query and snippet for document being analyzed |
|  | Absolute difference in reading level between query and snippet for document being analyzed |

III. Techniques for Using Reading Difficulty Levels in Responding to Requests

Several techniques for using reading difficulty levels in responding to requests will now be discussed. Each of these techniques can be performed in a computing environment. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable storage media may have computer-executable instructions embodied thereon that, when executed by at least one processor, cause at least one processor to perform the technique.

Figure 3:
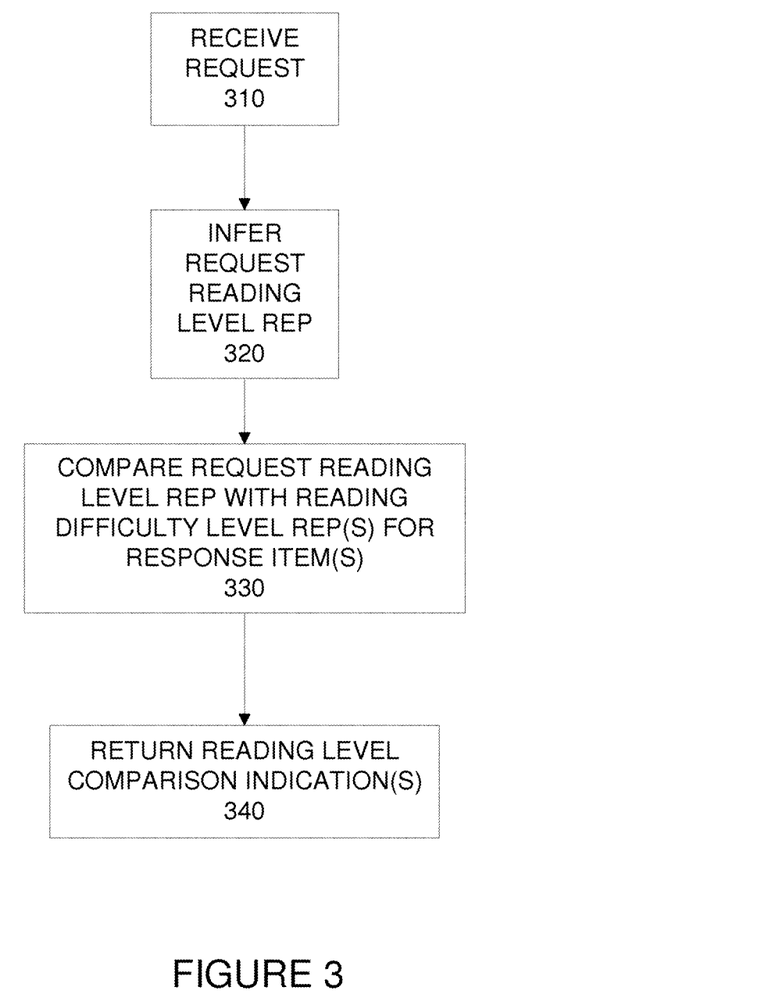
FIG. 3 is a flowchart of a technique for using reading difficulty levels in responding to requests.

Referring to FIG. 3, a technique for using reading difficulty levels in responding to requests will be described. The technique can include receiving (310) a request. A request reading level representation can be inferred (320). Inferring the request reading level representation can include performing a reading level analysis of one or more search queries. Also, inferring the request reading level representation can include performing a reading level analysis of one or more documents selected from a group consisting of previously-selected documents, previously-viewed documents, and combinations thereof (i.e., documents that have been previously-selected and previously-viewed). Inferring the request reading level representation can be based at least in part on various types of information. For example, inferring the request reading level representation can be based at least in part on inferring a reading level from one or more actions prior to the request in a search session that includes the request. Inferring the request reading level representation may be based at least in part on inferring a reading level associated with a user profile. As another example, inferring the request reading level representation may be based at least in part on inferring a reading level of text of the request.

The request reading level representation can be compared (330) with one or more reading difficulty level representations for one or more response items. In response to the request, one or more indications of results of comparing the request reading level representation with one or more reading difficulty level representations for the one or more response items can be returned (340). The response item(s) may also be returned along with the indication(s).

The indication(s) can include a ranking of the response items. The ranking may be a re-ranking that is based in part on an initial ranking of the response items. The indication(s) may include one or more indications of one or more presentation features of the response items. As used herein, presentation features of the response items are features that impact how the response items are displayed or otherwise presented to a user. For example, the presentation features could include level-appropriate presentation of response items such as search results (e.g., filtering search results to only display those appropriate for the estimated reading level for the current request), level-appropriate filtering of media types (images, videos, graphs), or adaptive search engine result page composition (modifying layout, colors, fonts, etc. to suit a search request's reading level(s)). Also, the response item(s) may include one or more documents (e.g., search suggestions, etc.) generated in response to the request and the one or more indications may include one or more features of the one or more generated documents. The feature(s) may be generated to match one or more reading levels of the request reading level representation. Also, the request reading level representation may include a reading level distribution over reading levels.

Figure 4:
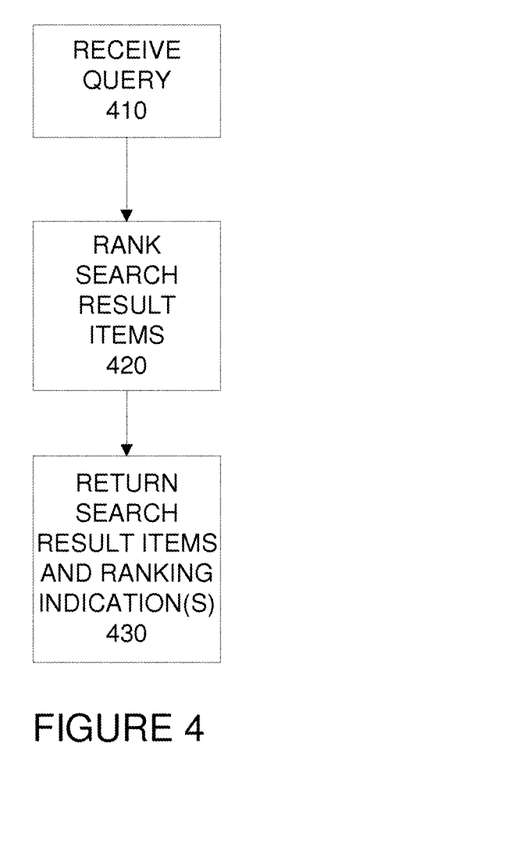
FIG. 4 is a flowchart of another technique for using reading difficulty levels in responding to requests.

Referring to FIG. 4, another technique for using reading difficulty levels in responding to requests will be described. The technique can include receiving (410) a query. In response to the query, search result items may be ranked (420). The ranking can be based at least in part on a query reading level representation for the query and reading difficulty level representations for the search result items. For example, the query reading level representation may be inferred, or it may be specified explicitly. In one example, all queries entered on a specific Web site (e.g., a Web site designed for use by children) could have the same or a similar query reading level representation. In response to the query, the search result items and one or more indications of the ranking can be returned (430). The ranking can include receiving an initial ranking of the search result items and re-ranking the search result items. The re-ranking can be based at least in part on a query reading level representation for the query and reading difficulty level representations for the search result items. The re-ranking may be based at least in part on the initial ranking.

The technique of FIG. 4 may also include inferring the query reading level representation from one or more user input actions associated with the query. Inferring the query reading level representation may include analyzing combinations of various different types of information. For example, inferring the query reading level representation may include analyzing the query itself, analyzing one or more prior queries, analyzing one or more user-selected documents (which may be done by analyzing the document(s) and/or one or more surrogates (e.g., snippets or result page captions) for the document(s)), and/or analyzing one or more explicit reading level indications from user input. Other information may also be analyzed, such as information from user profiles (e.g., education level listed for a social networking profile, hobbies or careers listed in a user profile or the profiles of other socially-connected users, etc.)

Figure 5:
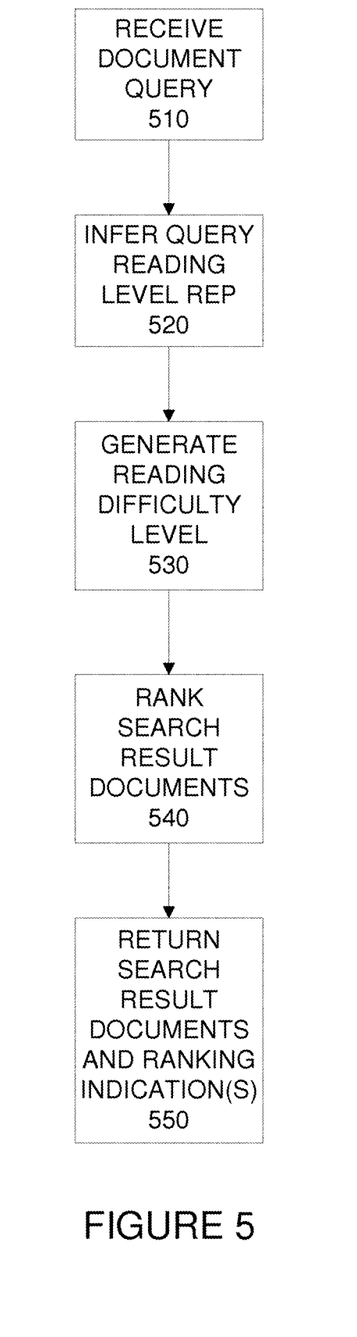
FIG. 5 is a flowchart of yet another technique for using reading difficulty levels in responding to requests.

Referring to FIG. 5, yet another technique for using reading difficulty levels in responding to requests will be described. The technique can include receiving a document query (510). A query reading level representation for the query can be inferred (520). The inferring (520) can include analyzing one or more reading levels of one or more selected documents and analyzing one or more reading levels of one or more queries. Reading difficulty level representations for search result documents can be generated (530). In response to the query, the search result documents can be ranked (540). The rankings can be based at least in part on one or more comparisons of the query reading level representation for the query and the reading difficulty level representations for the search result documents. Additionally, in response to the query, the search result documents can be returned (550) with one or more indications of the ranking.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
receiving a request;
inferring a request reading level representation for the request, inferring the request reading level representation for the request being based at least in part on previous behavior prior to the request, the previous behavior comprising a set of behavior, the set of behavior being computer-based search behavior or computer-based browsing behavior, the inferring the request reading level representation comprising:
defining a search session that includes the request;

identifying one or more search actions prior to the request in the search session; and inferring a reading level from the one or more search actions prior to the request in the search session;

in response to the request, comparing the request reading level representation with one or more reading difficulty level representations for one or more response items; and in response to the request, returning one or more indications of results of comparing the request reading level representation with one or more reading difficulty level representations for the one or more response items.

2. The method of claim 1, further comprising returning the one or more response items in response to the request.

3. The method of claim 1, wherein the one or more indications comprise a ranking of the response items.

4. The method of claim 1, wherein inferring the request reading level representation comprises performing a reading level analysis of one or more search queries.

5. The method of claim 1, wherein inferring the request reading level representation comprises performing a reading level analysis of one or more documents selected from a group consisting of previously-selected documents, previously-viewed documents, and combinations thereof.

6. The method of claim 1, wherein inferring the request reading level representation is based at least in part on inferring a reading level associated with a user profile.

7. The method of claim 1, wherein inferring the request reading level representation is based at least in part on inferring a reading level from text of the request.

8. The method of claim 1, wherein the one or more indications comprise one or more indications of one or more presentation features of the response items.

9. The method of claim 1, wherein the one or more response items comprise a document generated in response to the request and the one or more indications comprise a feature of the generated document, the feature being generated to match one or more reading levels of the request reading level representation.

10. The method of claim 1, wherein the request reading level representation comprises a reading level distribution over multiple distribution reading levels with the reading level distribution over multiple distribution reading levels comprising, for each of the multiple distribution reading levels, an indication of a probability that an item at that distribution reading level will be understood.

11. The method of claim 1, further comprising inferring the one or more reading difficulty level representations for the one or more response items, wherein inferring the one or more reading difficulty level representations for the one or more response items comprises accounting for frequency of use of each of one or more words in the one or more response items and accounting for reading level indications of each of the one or more words.

12. A computer system comprising:
at least one processor; and
memory comprising instructions stored thereon that when executed by at least one processor cause at least one processor to perform acts comprising:
receiving a query;
inferring a query reading level representation from one or more user input actions associated with the query, the query reading level representation comprising a reading level distribution over multiple distribution reading levels, with the reading level distribution over multiple distribution reading levels comprising, for each of the multiple distribution reading levels, an indication of a probability that an item at that distribution reading level will be understood;

in response to the query, ranking search result items, the ranking being based at least in part on the query reading level representation for the query and reading difficulty level representations for the search result items; and in response to the query, returning the search result items and one or more indications of the ranking.

13. The computer system of claim 12, wherein ranking comprises receiving an initial ranking of the search result items and re-ranking the search result items, the re-ranking being based at least in part on a query reading level representation for the query and reading difficulty level representations for the search result items.

14. The computer system of claim 13, wherein the re-ranking is based at least in part on the initial ranking.

15. The computer system of claim 12, wherein inferring the query reading level representation comprises analyzing the query.

16. The computer system of claim 12, wherein inferring the query reading level representation comprises analyzing one or more prior queries.

17. The computer system of claim 12, wherein inferring the query reading level representation comprises analyzing one or more user-selected documents.

18. The computer system of claim 12, wherein inferring the query reading level representation comprises analyzing one or more explicit reading level indications from user input.

19. One or more computer-readable storage media having computer-executable instructions embodied thereon that, when executed by at least one processor, cause at least one processor to perform acts comprising:
receiving a request;
inferring a request reading level representation for the request, inferring the request reading level representation for the request being based at least in part on previous behavior prior to the request, the previous behavior comprising a set of behavior, the set of behavior being computer-based search behavior or computer-based browsing behavior, the inferring the request reading level representation comprising:
defining a search session that includes the request;
identifying one or more search actions prior to the request in the search session; and
inferring a reading level from the one or more search actions prior to the request in the search session;

in response to the request, comparing the request reading level representation with one or more reading difficulty level representations for one or more response items; and in response to the request, returning one or more indications of results of comparing the request reading level representation with one or more reading difficulty level representations for the one or more response items.

20. The one or more computer-readable storage media of claim 19, wherein the acts further comprise inferring the one or more reading difficulty level representations for the one or more response items, wherein inferring the one or more reading difficulty level representations for the one or more response items comprises accounting for frequency of use of each of one or more words in the one or more response items and accounting for reading level indications of each of the one or more words.

* * * * *